United States Patent [19]

Harvey

[11] 4,197,270
[45] Apr. 8, 1980

[54] PROCESS FOR BONDING WITH POLYETHYLENE ENCAPSULANT

[75] Inventor: Bernard A. Harvey, Santa Barbara, Calif.

[73] Assignee: The United States of America as represented by the Secretary of the Navy, Washington, D.C.

[21] Appl. No.: 954,674

[22] Filed: Oct. 25, 1978

[51] Int. Cl.² ............................................. B29F 1/10
[52] U.S. Cl. .................................. 264/135; 427/185; 427/195; 264/272
[58] Field of Search ................ 264/135; 427/185, 195, 427/202, 203, 385 C, 386, 388, 407 R, 407 A, 407 B, 410 R

[56] References Cited

U.S. PATENT DOCUMENTS

| | | | |
|---|---|---|---|
| 3,650,809 | 3/1972 | Gilliam et al. | 427/388 R |
| 3,763,298 | 10/1973 | Sharman et al. | 264/135 |
| 3,941,866 | 3/1976 | Ingraham | 264/135 |
| 4,122,211 | 10/1978 | Kikuga et al. | 427/202 |

*Primary Examiner*—Edward J. Smith
*Attorney, Agent, or Firm*—R. S. Sciascia; L. I. Shrago; C. E. Vautrain, Jr.

[57] ABSTRACT

A process for producing a bond at the interface between an encapsulant and the object to be encapsulated is provided. A selected resin with curing agent is coated and oven cured on the object to be encapsulated and thereafter a copolymer coating is applied to the assembly in a fluidized bed and the assembly is oven cured. The resulting product is then injection molded with a suitable polyethylene material.

2 Claims, 10 Drawing Figures

RE-COAT TO COVER
DE-WETTING AS
REQUIRED

PROCESS FOR BONDING WITH POLYETHYLENE ENCAPSULANT

This invention concerns polyethylene coatings and, more particularly, such a coating which forms an intimate contact that avoids the tendency of polyethylene to separate from the surface of molded objects.

Polyethylene is a rigid, waxy, translucent, synthetic resin having excellent dielectric properties, ozone resistance, moisture resistance, and chemical stability. It has been extensively used for insulating high frequency conductors as well as for forming an intimate bond between an electrostatic shield and polyethylene or polypropylene insulation surrounding an electrical conductor, among other uses. Because of the tendency of the polyethylene to separate from the surface of molded items, particularly those made of ceramics, its use in this and other fields is limited primarily due to the extremely high temperature required in most primers to bond the polyethylene to the surface. The present invention provides a process for resin-coating hydrophone assemblies which produces an effective interface bonding without requiring damaging high temperatures.

Accordingly, it is an object of the present invention to provide a bond of intimate contact that resists the tendency of polyethylene to separate from the surface of molded objects.

Another object of this invention is to provide an interface bonding sufficiently strong to withstand the acoustic performance repeatibility required of hydrophones or in other similar applications.

A further object of this invention is to provide a process for resin-coating hydrophone assemblies which is not limited by the extremely high temperature required in most primers to bond polyethylene to the surface of molded items.

Other objects, advantages and novel features of the invention will become apparent from the following detailed description thereof when considered in conjunction with the accompanying drawings in which like numerals represent like parts throughout and wherein.

The present invention relates generally to a process for coating elements preparatory to polyethylene encapsulation thereof in such a manner as to avoid the tendency of polyethylene to separate from the surface of molded objects. The process primarily provides a mechanical lock for particles of ethylene-vinyl-acetate, a more suitable compound than, for example, low density polyethylene, since ethylene-vinyl-acetate has a somewhat lower melting point. In one embodiment, a bisphenol-a-epichlorhydrin epoxy resin modified with butyl glycidyl ether and using an appropriate tertiary amine salt as hardener, such as Type 815 Epon with curing agent D, is coated and oven cured on the object to be encapsulated, a hydrophone assembly for example. An ethylene-vinyl-acetate copolymer such as Microthene MU 763 manufactured by U.S. Industrial Chemicals, 99 Park Ave., New York, N.Y. 10016 is coated in a fluidized bed onto the wetted 815 Epon coating and oven cured. The resulting assembly is then injection molded with a suitable polyethylene material such as Union Carbide #DFDA-0588, Black 9865 manufactured by Union Carbide Corporation, Chemical and Plastics Division, 100 Ocean Gate, Long Beach, California 90802 to provide a bond at the interface between the coated assembly and the polyethylene mold.

Figure 1:
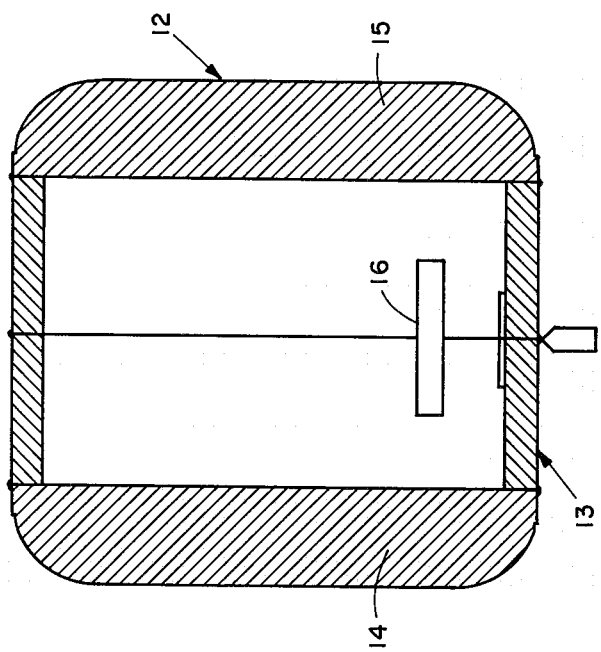
FIG. 1 is a sectional view of a hydrophone element to be polyethylene coated.
Figure 4:
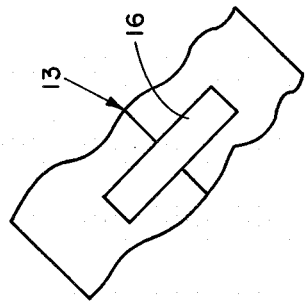
FIG. 4 is an isolated view showing the manner in which a jump strip is positioned on the hydrophone element of FIG. 1.
Figure 2:
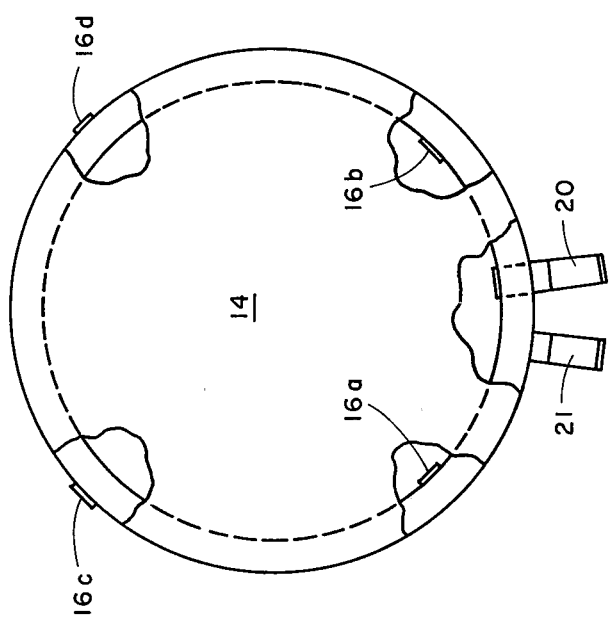
FIG. 2 is a plan view of a cap end of the element of FIG. 1.
Figure 3:
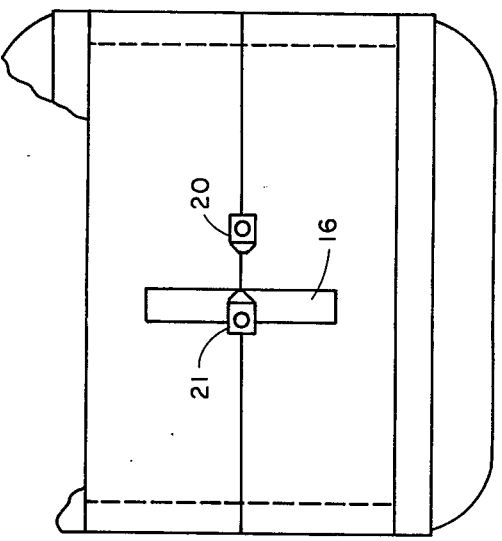
FIG. 3 is a front elevation partly cut away of the element of FIG. 1.

Referring to the drawings, FIG. 1 shows a hydrophone assembly 12 comprising a central cylinder 13, a pair of end caps 14 and 15, and a plurality of jumper strips 16 preferably symmetrically spaced about the periphery of cylinder 13. In this embodiment, cylinder 13 and caps 14 and 15 comprise a hydrophone asssembly preferably made of ceramic material and are bonded together at their adjoining sections to provide a closed cylinder space. FIG. 2 shows end cap 14 and jumper strips 16 of which 16a and 16b are disposed within the assembly and 16c and 16d are disposed on the exterior of the assembly. An inner electrical feed-through 20 and an outer electrical connection tab 21 are provided in this assembly. FIGS. 3 and 4 show the foregoing components in different perspective.

Figure 5:
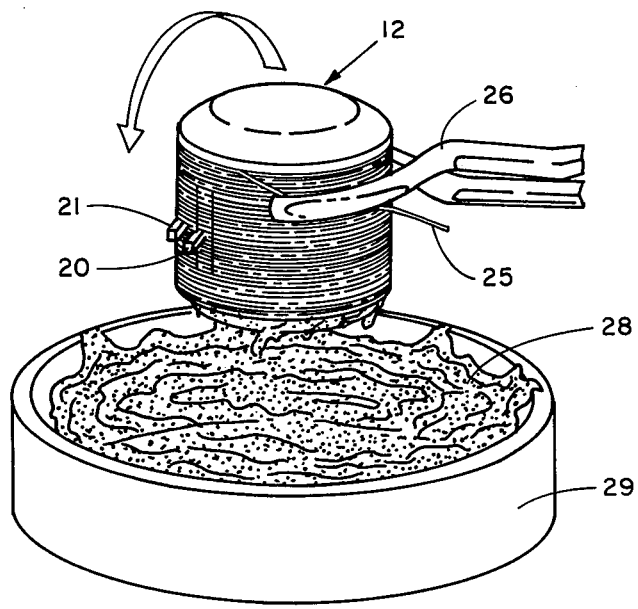
FIG. 5 is a perspective view illustrating the partial coating of the hydrophone element of FIG. 1.
Figure 6:
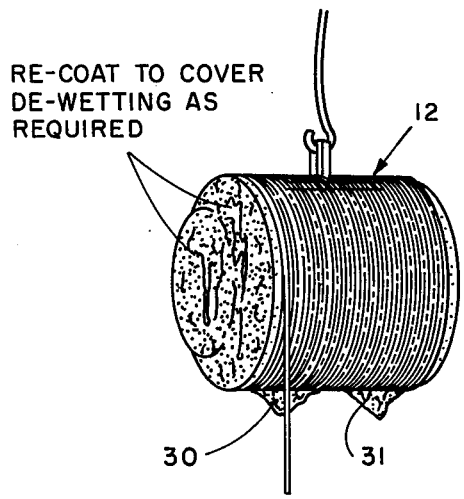
FIG. 6 is a perspective view illustrating a procedure for drying the coating applied in FIG. 5.

FIG. 5 shows the procedure for coating hydrophone assembly 12 with a suitable resin after the assembly has been degreased and wound with a fiberglass roving 25 that spans cylinder 13 and the bases of end caps 14 and 15. Roving 25 is held down with a pair of tongs 26 and the assembly is preheated to a nominal temperature of preferably 130°–150° F. after which the end caps and adjacent roving are submerged successively in a resin 28 contained in a shallow cup 29, being retained therein a sufficient time to allow for thorough coating of the submerged areas. The assembly is then hung to dry as indicated in FIG. 6 and droplet formations such as at 30 and 31 are flattened out by brush.

The end caps and adjacent roving, after the assembly has been hanging for a period of about 5 minutes, are then redipped in resin 28 to provide a uniform coating prior to being transferred to an oven, not shown, in which the resin is allowed to cure at a temperature on the order of from 300°–320° F. for substantially 55–65 minutes. Upon completion of the cure cycle, surface irregularities are removed from the assembly using a hand file, a routing fixture, etc. as required. Care is taken to not rout or file through the roving or coating to the jumper strips or the end caps, and the assembly is carefully examined to assure that no resin voids exist between the fiberglass and the cylinder surface. The fiberglass roving layer and its resin coating should be uniform over the entire cylinder and the end caps should be completely coated with a thin layer of resin, which when fully cured will be hard and glassy. If voids are found to exist, the cured resin should be completely removed from the de-wetted end caps by grit-blast, sanding or filing as required and the coating procedure repeated.

Figure 7:
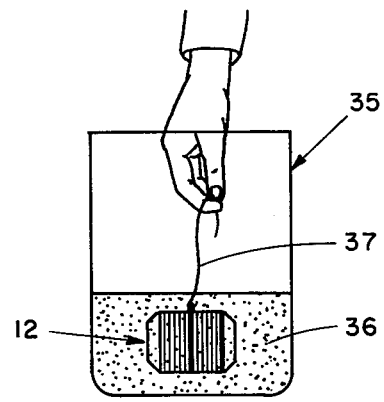
FIG. 7 is a perspective view showing the application of a resin coating to the coated element of FIG. 6.
Figures 8, 9:
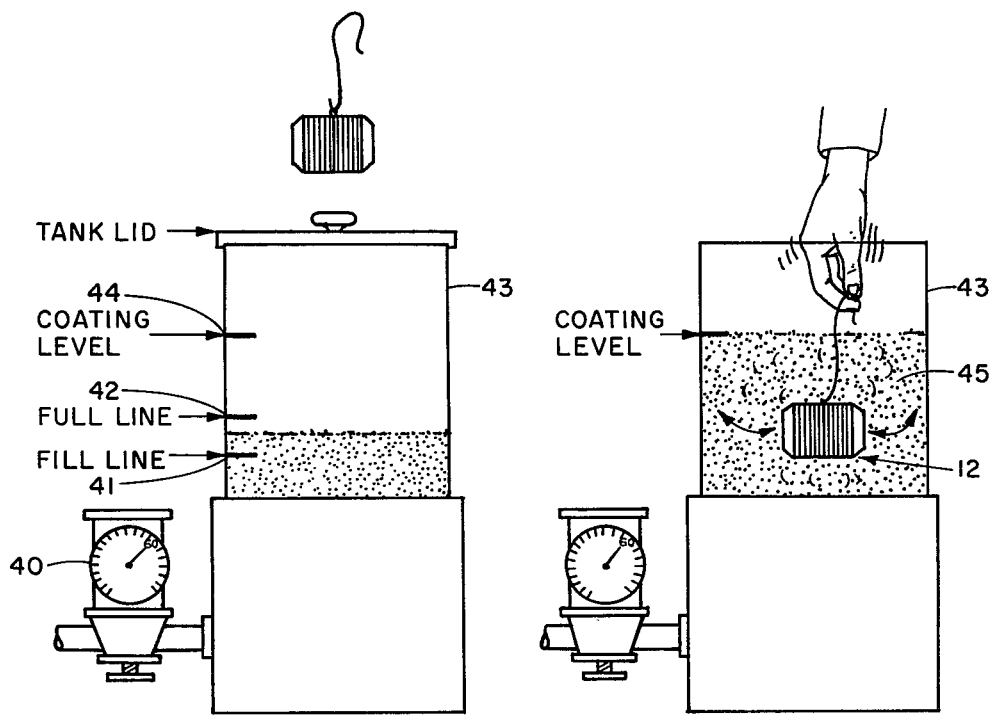
FIG. 8 is a schematic drawing showing the preparation for applying a powdered coating to the element of FIG. 7.
FIG. 9 is a schematic drawing showing the application of a powdered coating to the element of FIG. 7.

After the resin coating applied as in FIG. 5 is fully cured and degreased, the assembly is lowered into a second resin bath 35, shown in FIG. 7, containing a resin 36 such as Epon 815 and Epon curing agent D preferably using a mix ratio of 12 parts curing agent to 100 parts 815 by weight. The assembly is dipped into resin 36 using any convenient holder such as a wire hanger 37 and after complete resin coverage has been achieved the assembly is removed and allowed to drip for substantially 20 minutes before brushing flat any remaining droplets. A fluidized bed such as that shown in FIG. 8 is used in the next step of the process to fully coat the assembly with powdered ethylene-vinyl-acetate copolymer while the resin 36 coating is still wet. In the fluidized bed arrangement shown in FIG. 8, a pressure on the order of from 40 to 60 psi, indicated by gauge 40, and an at rest powdered level between fill line 41 and a full line 42 in a tank 43 are preferred. The components will provide a bed having a coating level indicated at 44 when the powder is agitated into a plasma 45 as shown in FIG. 9. Assembly 12 is lowered into plasma 45 and gently swayed from end to end or otherwise moved in the tank to assure an adequate coating of powder ethylene-vinyl-acetate on end caps 14 and 15. Movement of the assembly in the plasma is continued until the entire assembly is thoroughly coated and thereafter it is withdrawn from the tank and gently but thoroughly shaken to remove excess ethylene-vinyl-acetate powder. The assembly is then hung in an oven, not shown, to cure at a temperature of substantially 300°-320° F. for a period on the order of 55-65 minutes. The assembly is then inspected to assure that the fluid-bed coating is uniform over its entire surface, that the underlying resin 36 coating is completely cured, and that the powdered ethylene-vinyl-acetate has melted into the resin 36 surface without evidence of flaking. These conditions indicate that the fluid-bed coating is bonded to the resin 36 coating, in the absence of evidence of sub-surface voids or peeling.

Figure 10:
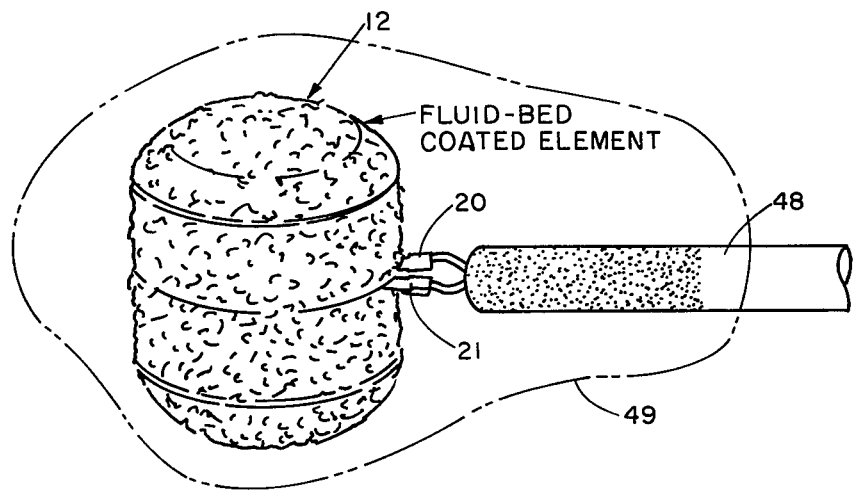
FIG. 10 is a perspective view showing the fluid-bed coated element of FIG. 9.

FIG. 10 is a perspective view showing the assembly fully coated with the fluid-bed coating and a connecting cable 48 attached to the assembly at electrical connections 20 and 21. The assembly and cable are cleaned in the region indicated at 49 preferably in an ultrasonic cleaner and preferably with Freon TF for a minimum of substantially 2 minutes. A mold containing the shape of the desired final configuration, not shown, is preheated along with the assembly and cable to a temperature of substantially 100°-120° F. The mold cavity is cleaned with Freon TF lint-free tissue and a clean rubber bushing is inserted to one of the mold halves centering mold. This bushing centers the assembly in the mold and the mold is closed with a mold half having a cavity which contains one half of the final molded shape. The assemblage is then fixed onto a centering fixture on an injection press table. The mold is then filled with polyethylene preferably derived from heated virgin polyethylene pellets. The injected polyethylene after filling the mold-half is held under pressure for substantially 10 minutes and upon release of the injection pressure the mold is removed to a cooling area and allowed to cool for substantially a 10 minute cooling period. At completion of the cooling period the mold halves are separated and the centering mold half is returned to the storage oven and, with the assembly remaining in the final-half mold, the centering mold flashing is trimmed away. The interface surfaces between the mold halves are then cleaned with Freon TF lint-free tissue. The half of the mold with rubber bushing is replaced by a third mold part which is a duplicate of the part the molded hydrophone is sitting in. This closed mold is placed again in the molding machine and injected in the same manner as the first mold using the same parameters of time and temperature as stated supra. At the completion of the second cooling period, the assembly is removed from the mold and appropriate fittings such as monel bushings are installed and the flashing is trimmed. After a minimum period of substantially 12 hours allowed for shrinkage, the excess sprue is removed from the mold to meet the desired dimensions of the assembly. It will be appreciated that the compounds used to provide the various coatings and moldings may be varied and the heating and cooling times may also be varied within the concept of the invention.

There is thus provided a process for producing a mechanical interlocking bond at the interface between an encapsulant and an object to be encapsulated which is not limited by the temperatures required in most primers for bonding polyethylene to the surface of molded items. The object is first coated with a low temperature resin that will harden to a desired hardness. A second resin is then applied over the entire surface of the coated object and, after smoothing the surface of the second resin while still wet, the object is placed in a fluid bed and coated with powdered ethylene-vinyl-acetate which adheres to the wetted surface of the previous coating. The powdered ethylene-vinyl-acetate and resin are then cured and the entire surface is checked for evidence of flaking or other flaws. With the assembly coated with an outer coating of ethylene-vinyl-acetate, a final coating of polyethylene may be applied at low mold temperatures on the order of from 100°-120° F., with the molten polyethylene temperature in the range 480° F. to 525° F., thereby providing a bond between the underlying ethylene coating and the outer polyethylene coating. Additional polyethylene coatings may be applied to produce the dimensions desired in the object.

Obviously many modifications and variations of the invention are possible in the light of the foregoing teachings. For example, any resin, either oven cured or air cured, that will provide the mechanical lock for ethylene-vinyl-acetate particles and at the same time adhere to any surface will effect such a bond between the polyethylene and the surface to which the resin is adhered.

What is claimed is:
1. A process for encapsulating a hydrophone assembly made of ceramic material without requiring heating to temperatures that damage its sensitive components comprising:
   a central cylinder section and a pair of end caps bonded together at their adjoining surfaces to form a closed cylindrical space;
   an inner electrical feed-through and an outer electrical connection in said center cylinder section;
   a fiberglass roving wound about said assembly end caps and extending onto a substantial surface area of said center cylinder section;
   preheating said assembly with fiberglass roving to a temperature on the order of from 130° F. to 150° F. and submerging successively the roving wound ends thereof in a suitable resin a sufficient time to allow for thorough coating of the immersed ce- ramic surfaces with resin and allowing the resin to dry;

coating said assembly with resin in a bath containing a suitable mixed resin and curing agent and while wet coating said assembly with powdered ethylene-vinyl-acetate in a fluidized bed;

removing excess powder by thorough shaking and curing said wet resin and powder at a temperature of substantially 300°-320° F. for a period on the order of from 55 to 65 minutes;

bonding a polyethylene jacket about said assembly in a mold by injecting polyethylene derived from heated virgin polyethylene pellets thereinto; and maintaining injection pressure on the injected polyethylene for substantially 10 minutes and upon release of injection pressure cooling the mold for substantially 10 minutes, whereby a bond is provided between an underlying resin coating and an outer polyethylene coating without damage to heat-sensitive hydrophone components.

2. The process of claim 1 wherein said mold is preheated to a temperature of substantially 100° to 120° F. and the molten temperature of said virgin polyethylene pellets is on the order of from 480° to 525° F.

* * * * *